United States Patent
Masui et al.

(10) Patent No.: US 10,611,240 B2
(45) Date of Patent: Apr. 7, 2020

(54) VEHICLE CRUISE CONTROL APPARATUS AND CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Mitsuhiro Tokimasa, Kariya (JP); Toyoharu Katsukura, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 127 days.

(21) Appl. No.: 15/529,911

(22) PCT Filed: Oct. 5, 2015

(86) PCT No.: PCT/JP2015/078135
§ 371 (c)(1),
(2) Date: May 25, 2017

(87) PCT Pub. No.: WO2016/084478
PCT Pub. Date: Jun. 2, 2016

(65) Prior Publication Data
US 2017/0326980 A1    Nov. 16, 2017

(30) Foreign Application Priority Data
Nov. 28, 2014 (JP) .................... 2014-242230

(51) Int. Cl.
*B60K 31/00* (2006.01)
*G01S 13/93* (2020.01)
(Continued)

(52) U.S. Cl.
CPC ...... *B60K 31/0008* (2013.01); *B60K 31/0066* (2013.01); *B60R 21/00* (2013.01);
(Continued)

(58) Field of Classification Search
CPC ............ B60K 31/0008; B60K 31/0066; G08G 1/167; G08G 1/166; G06K 9/00805;
(Continued)

(56) References Cited

U.S. PATENT DOCUMENTS 5,999,874 A * 12/1999 Winner .............. B60K 31/0008
340/903
6,230,093 B1 * 5/2001 Michi ................... G01S 13/931
180/167

(Continued)

FOREIGN PATENT DOCUMENTS

JP    2002-531886 A    9/2002
JP    2004-161095 A    10/2004
(Continued)

*Primary Examiner* — Nga X Nguyen
(74) *Attorney, Agent, or Firm* — Knobbe, Martens, Olson & Bear, LLP

(57) ABSTRACT

A cruise control apparatus controls travel of an own vehicle based on a predicted course which is a future travel course of the own vehicle. The cruise control apparatus includes a first predicted course calculating unit and a second predicted course calculating unit, as a plurality of course prediction means for calculating a predicted course, and is provided with a course change determination unit for determining whether a change in the course is to be performed and a prediction switching unit which performs switching to enable one of a first predicted course calculated by the first predicted course calculating unit and a second predicted course calculated by the second predicted course calculation unit, the switching being based on a result of determination
(Continued)

made by the course change determination unit as to whether a change in the course is to be performed.

14 Claims, 5 Drawing Sheets

(51) Int. Cl.
| | | |
|---|---|---|
| *B60R 21/00* | (2006.01) | |
| *G06K 9/00* | (2006.01) | |
| *G08G 1/16* | (2006.01) | |
| *B60W 30/00* | (2006.01) | |
| *G01S 13/931* | (2020.01) | |

(52) U.S. Cl.
CPC ........... *B60W 30/00* (2013.01); *G01S 13/931* (2013.01); *G06K 9/00805* (2013.01); *G08G 1/166* (2013.01); *G08G 1/167* (2013.01); *B60T 2260/09* (2013.01); *B60W 2720/12* (2013.01); *G01S 2013/9321* (2013.01); *G01S 2013/9346* (2013.01); *G01S 2013/9353* (2013.01)

(58) Field of Classification Search
CPC ... B60W 30/00; B60W 2720/12; B60R 21/00; G01S 2013/9321; G01S 2013/9346; G01S 2013/9353; G01S 13/931; B60T 2260/09
See application file for complete search history.

(56) References Cited

U.S. PATENT DOCUMENTS

| | | |
|---|---|---|
| 6,853,906 B1 | 2/2005 | Michi et al. |
| 2014/0336844 A1* | 11/2014 | Schwindt .......... B60W 50/0097 701/1 |

FOREIGN PATENT DOCUMENTS

| | | |
|---|---|---|
| JP | 2004-078333 A | 11/2004 |
| JP | 2006-206011 | 8/2006 |
| JP | 2011-098586 A | 5/2011 |
| JP | 2012-252500 A | 12/2012 |

* cited by examiner

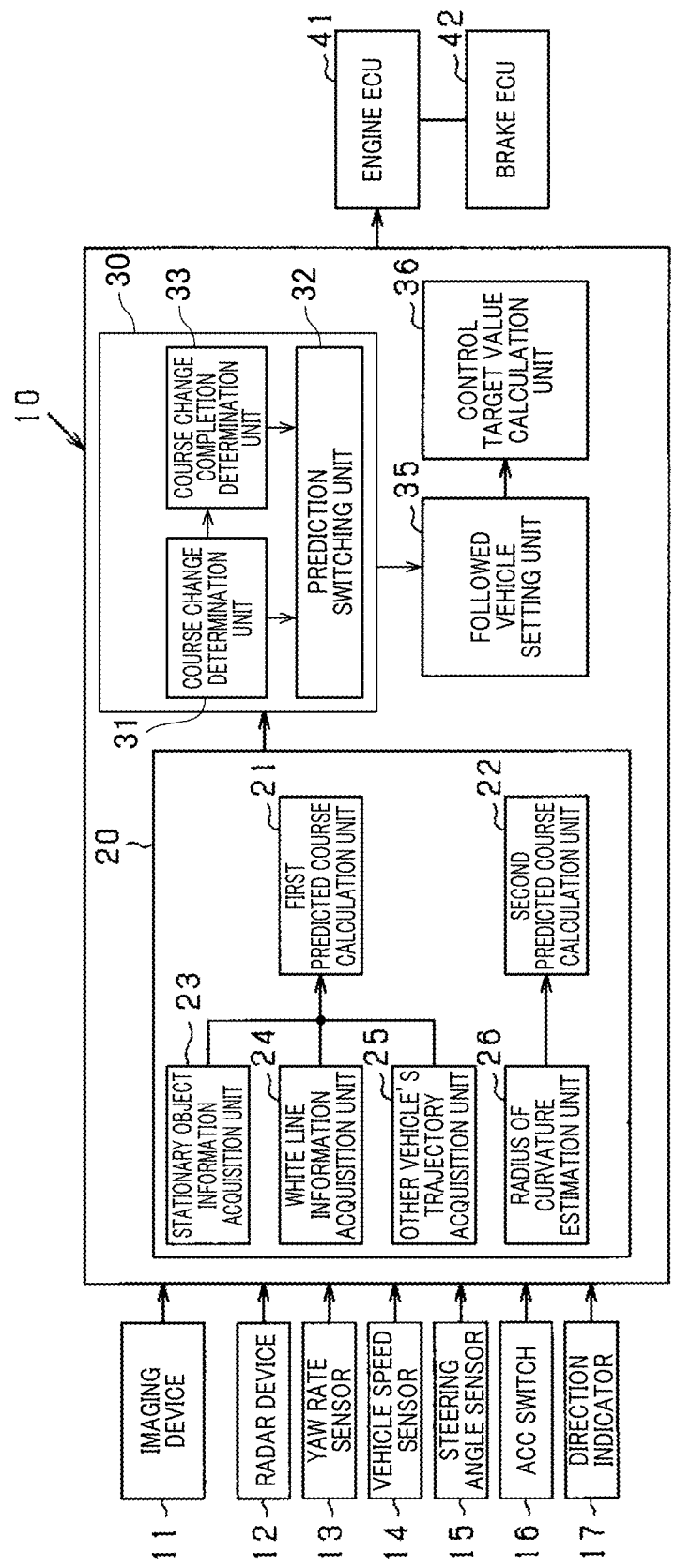

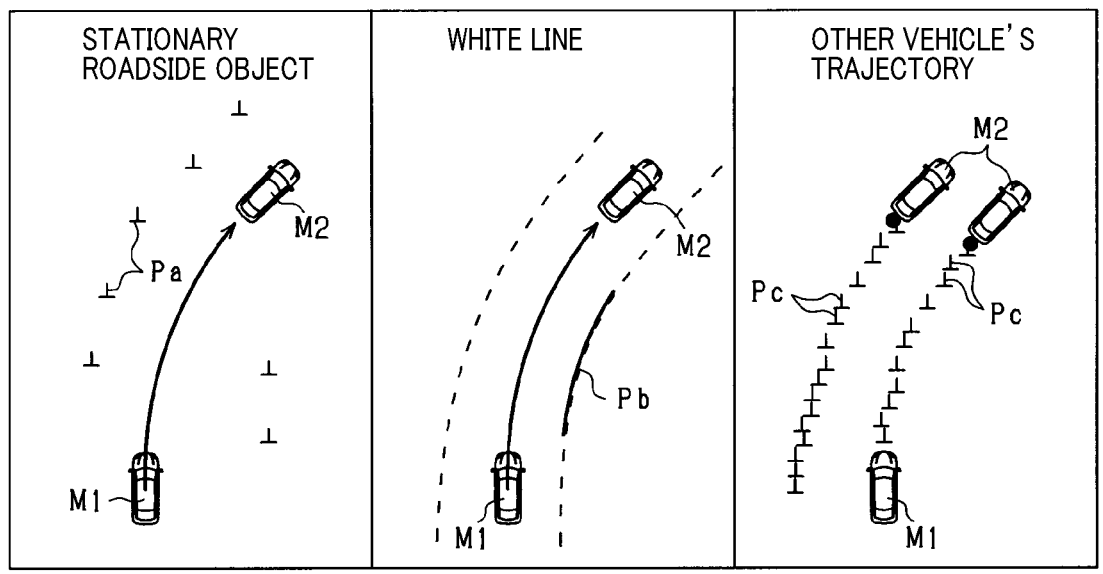
FIG. 2A  FIG. 2B  FIG. 2C
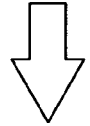
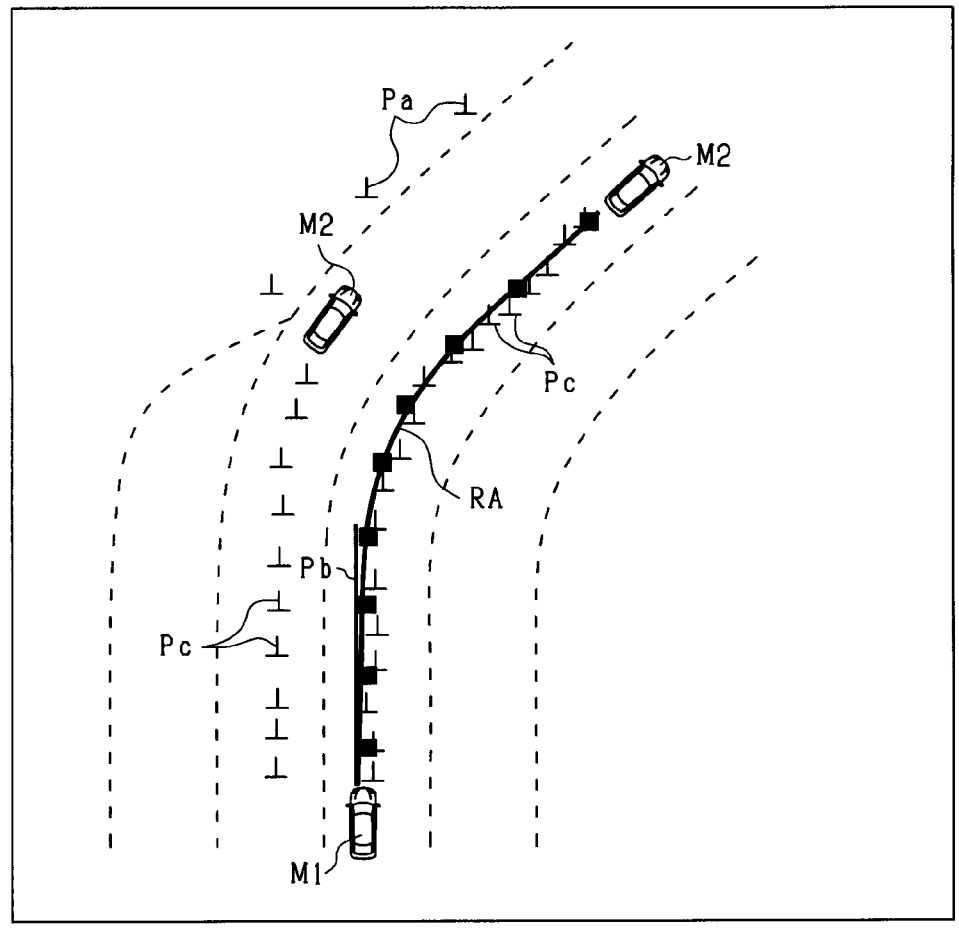
FIG. 2D

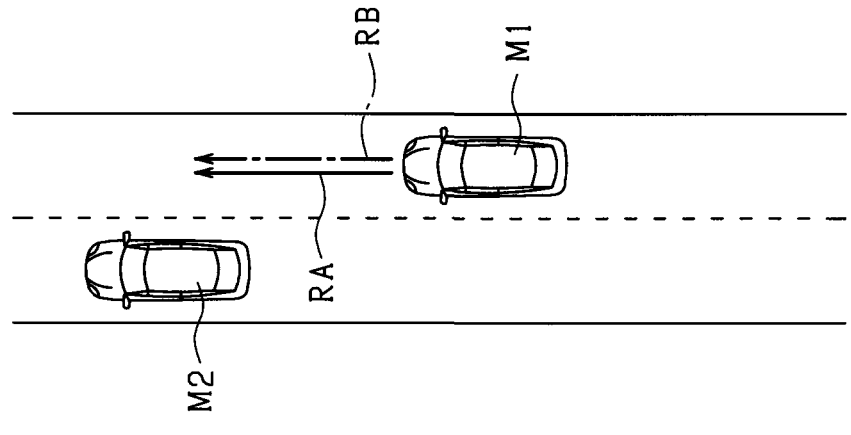
FIG.3A WHEN FOLLOWING PRECEDING VEHICLE
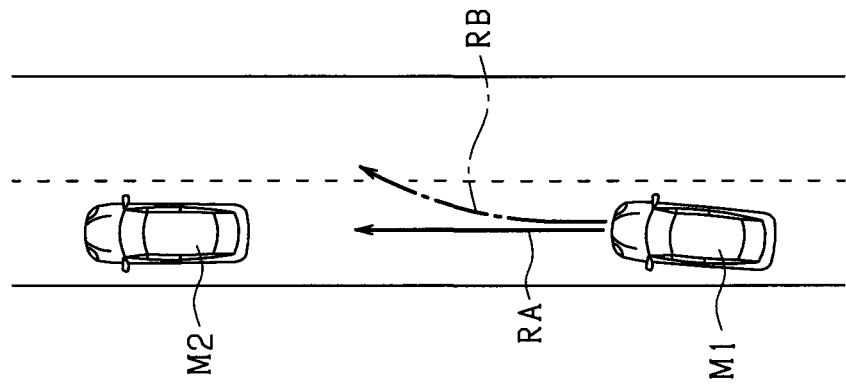
FIG.3B WHEN COMMENCING LANE CHANGE
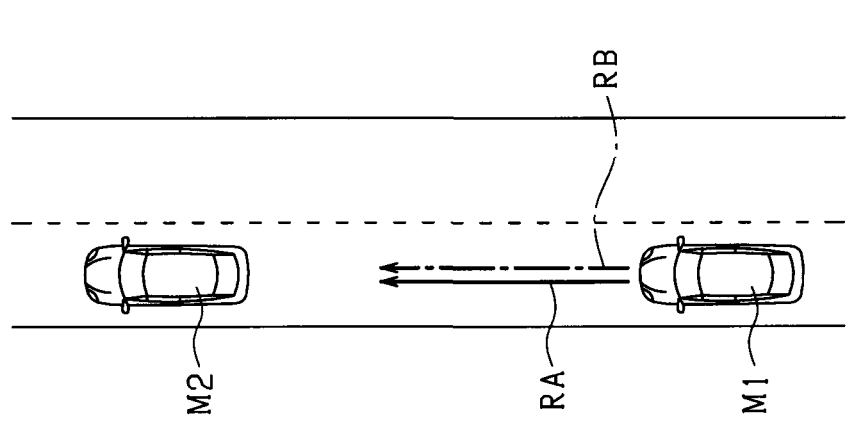
FIG.3C AFTER COMPLETING LANE CHANGE

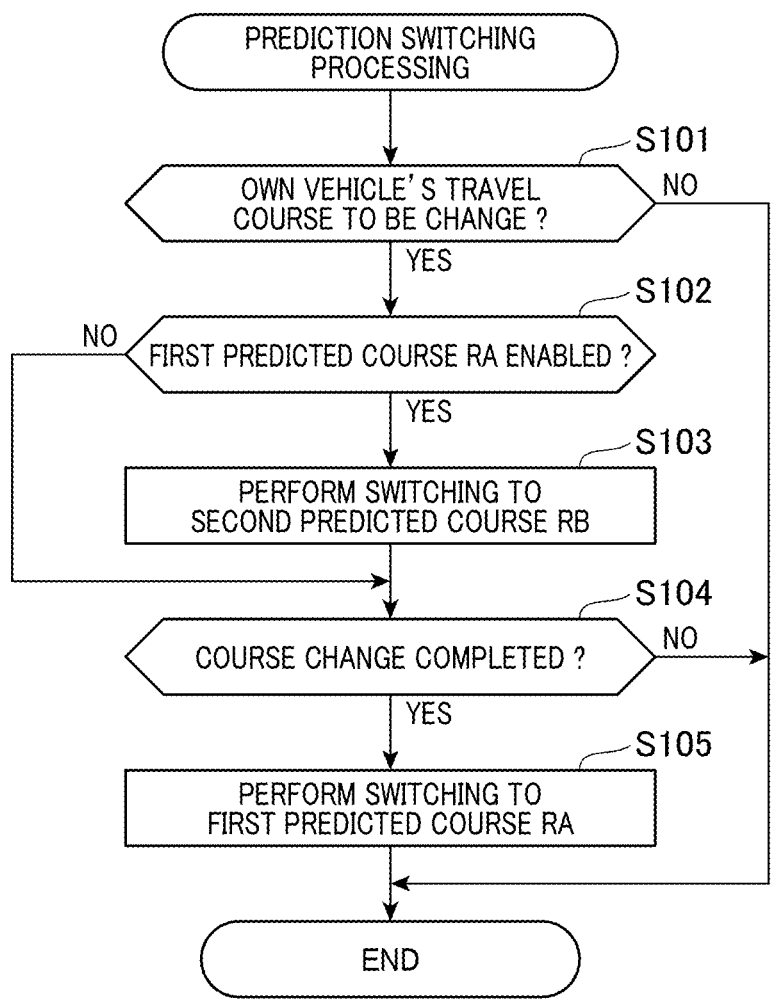

VEHICLE CRUISE CONTROL APPARATUS AND CRUISE CONTROL METHOD

CROSS-REFERENCE TO RELATED APPLICATION

This application is based on and claims the benefit of priority from earlier Japanese Patent Application No. 2014-242230 filed on Nov. 28, 2014 the descriptions of which is incorporated herein by reference.

TECHNICAL FIELD

The present disclosure relates to a vehicle cruise control technique which controls traveling of the own vehicle based on a predicted course of the own vehicle.

BACKGROUND ART

One known cruise assist control is a vehicle-following control which controls the own vehicle to follow a preceding vehicle traveling in the same lane as the own vehicle from among preceding vehicles traveling ahead of the own vehicle. In such a vehicle-following control, it is important that a vehicle traveling in the same lane as the own vehicle is identified with high accuracy from among preceding vehicles that are detected by, for example, sensors, cameras or the like. Hence, in the conventional technique, a future travel course of the own vehicle is calculated, and a preceding vehicle which is on that future travel course is subjected to a vehicle-following control. Various methods of calculating a future travel course of the own vehicle have been proposed (see, for example, PTL 1). PTL 1 discloses that the trajectory of a preceding vehicle traveling ahead of the own vehicle is stored to calculate a future travel course of the own vehicle using the stored travel path.

CITATION LIST

Patent Literature

[PTL 1] JP 2002-531886 T

SUMMARY OF THE INVENTION

Technical Problem

The technique of PTL 1 uses, as a basis, the travel path of a preceding vehicle to estimate the shape of the road when the own vehicle is following the preceding vehicle that is in the same lane as the own vehicle, and the result of the estimation is taken as a future travel course of the own vehicle. Since the technique of PTL 1 does not consider the own vehicle's behaviors such as of changing lanes, or changing course at a fork or a junction, highly accurate prediction results are not necessarily obtained when the own vehicle behavior does not conform to the shape of the road.

An objective of the present disclosure is to provide a vehicle cruise control technique that is capable of accurately predicting the course of the own vehicle at a time when the course is changed.

Solution to Problem

The present disclosure employs the following means.
The present disclosure relates to a vehicle cruise control apparatus, which controls travelling of the own vehicle based on a predicted course which is a future travelling course of the own vehicle. The cruise control apparatus according to the present disclosure includes a plurality of course prediction means that calculate a predicted course, a change determination means that determines whether the own vehicle is making a course change, and a prediction switching means that performs switching to determine which of respective predicted courses, calculated by the plurality of course prediction means, is to be enabled, based on the results of the determination made by the change determination means.

In summary, the cruise control apparatus of the present disclosure includes the plurality of course prediction means which employ respectively different methods of predicting the future travel course of the own vehicle. The cruise control apparatus is configured to perform switching to execute the cruise control of the own vehicle using the course that is predicted by one of the plurality of course prediction means in accordance with whether the course of the own vehicle is to be changed. The orientation, etc., of the own vehicle with respect to its travel course differs between the case in which the own vehicle is to change its course, and the case in which the driver continues traveling along the same lane, not desiring to change the course. For this reason, an optimum means for predicting the course of the own vehicle may differ, between the case in which the own vehicle is to change its course and the case in which no course change is to be made. With the cruise control apparatus of the present disclosure, an optimum course prediction means can be selected from among a plurality of such means, taking into account of whether the own vehicle is to change its course. As a result, the accuracy of predicting the course of the own vehicle can be improved when the course is being changed.

BRIEF DESCRIPTION OF THE DRAWINGS

FIG. 1 is a block diagram illustrating a schematic configuration of a vehicle cruise control apparatus.

FIG. 2A illustrates a plurality of stationary object detection points.

FIG. 2B illustrates white-line information.

FIG. 2C illustrates the history of a plurality of vehicle detection points.

FIG. 2D illustrates the first predicted course calculated by using the stationary object detection points, the white line information and the vehicle detection points.

FIG. 3A illustrates a situation in which an own vehicle is following a preceding vehicle.

FIG. 3B illustrates a situation in which the own vehicle starts a lane change.

FIG. 3C illustrates a situation in which the own vehicle has completed the lane change.

FIG. 4 is a flow diagram illustrating prediction switching processing.

DESCRIPTION OF THE EMBODIMENTS

Figure 5:
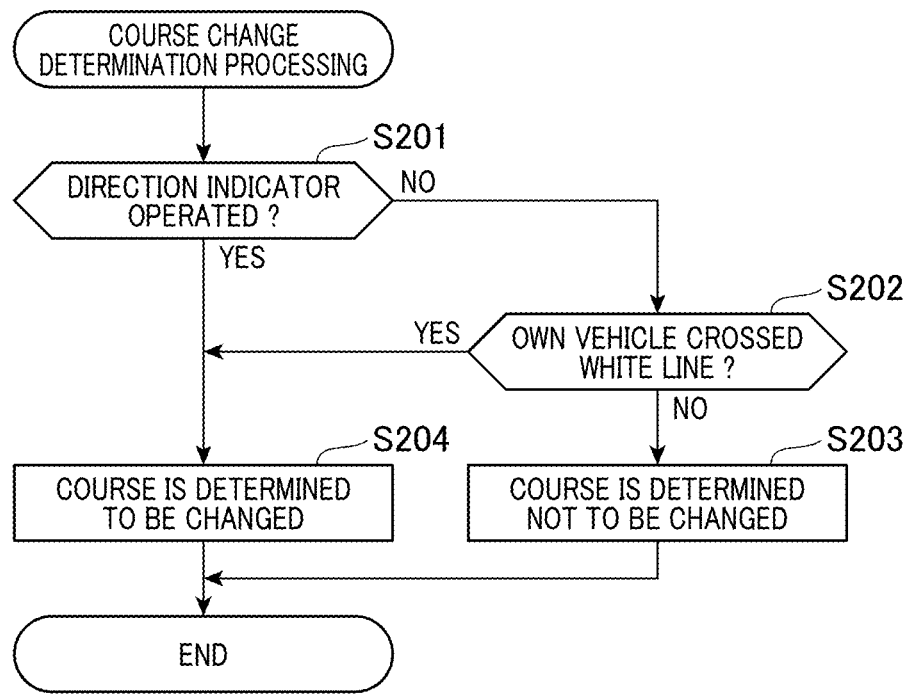
FIG. 5 is a flow diagram illustrating a subroutine of course change determination processing.

With reference to the drawings, embodiments of a vehicle cruise control apparatus will be described. The cruise control apparatus according to the present embodiment is mounted to a vehicle. The cruise control apparatus performs vehicle-following control, for controlling the own vehicle to travel following a preceding vehicle which is traveling in the same lane as the own vehicle, among preceding vehicles traveling ahead of the own vehicle. The vehicle-following control controls an inter-vehicle distance between the own vehicle and the preceding vehicle. First, with reference to FIG. 1, a configuration of the cruise control apparatus according to the present embodiment will be roughly described.

A cruise control apparatus 10 shown in FIG. 1 is a computer which includes a CPU, a ROM, a RAM, an I/O, etc. The cruise control apparatus 10 is provided with a course prediction section 20, a predicted course setting section 30, a followed-vehicle setting unit 35, and a control target value calculating unit 36, whose respective functions are implemented by the CPU in executing a program stored in the ROM. The vehicle (the own vehicle) is mounted with an object detection means, for detecting objects around the vehicle. The cruise control apparatus 10 receives, as input information, detection information from the object detection means concerning detected objects, and performs vehicle-following control, for controlling the own vehicle to follow the preceding vehicle, based on the input information. The own vehicle is provided with an imaging device 11 and a radar device 12 as the object detection means.

The imaging device 11 is an in-vehicle camera, such as a CCD camera, a CMOS image sensor, a near infrared camera, etc. The imaging device 11 captures images of the surrounding environment, including the road on the own vehicle, and then generates image data representing the captured images to sequentially output the image data to the cruise control apparatus 10. The imaging device 11 is installed, for example, near the upper side of the windshield of the own vehicle, and captures images of a region extending ahead of the own vehicle at a predetermined angle θ1 centering on an imaging axis. The imaging device 11 may be a monocular camera or a stereo camera.

The radar device 12 is a detection device that transmits electromagnetic waves as transmission waves (search waves) and detects objects by receiving the reflected waves. In the present embodiment, the radar device 12 is a millimeter wave radar. The radar device 12 is mounted to a front portion of the own vehicle and scans a region, extending ahead of the vehicle at a predetermined angle θ2 (θ2<θ1) centering on an optical axis using radar signals. Then the radar device 12 creates distance measurement data based on the time from the transmission of the electromagnetic waves ahead of the vehicle until the time of reception of the reflected waves, and then the generated distance measurement data are sequentially outputted to the cruise control apparatus 10. The distance measurement data include information on the azimuth in which an object is present, the distance from the own vehicle to the object, and the relative velocity between the own vehicle and the object.

When the own vehicle is shipped, the imaging device 11 and the radar device 12 are respectively mounted such that an imaging axis which is a reference axis of the imaging device 11 and an optical axis which is a reference axis of the radar device 12 are oriented in the same direction, parallel to the surface of the trajectory of the own vehicle. The detectable area of the imaging device 11 and the detectable area of the radar device 12 overlap each other at least partially.

The cruise control apparatus 10 receives, as inputs, the image data from the imaging device 11 and the distance measurement data from the radar device 12, and detection signals from various sensors mounted to the vehicle. The various sensors include a yaw rate sensor 13 for detecting the angular velocity (hereinafter referred to as "yaw rate") at which the vehicle turns, and a vehicle speed sensor 14 for detecting the vehicle speed, etc. The vehicle is further provided with a steering angle sensor 15 for detecting the steering angle, and an ACC switch 16 operated by the driver to select a vehicle-following control mode, etc.

The vehicle is further provided with a direction indicator 17, for displaying the travel direction of the vehicle at the exterior of the vehicle. The direction indicator 17 is provided with an operating lever that is manipulated by the driver into each of a left-indication position, a neutral position and a right-indication position, and outputs an operation signal corresponding to the position of the operating lever to the cruise control apparatus 10.

The course prediction section 20 is a calculation section that predicts the course of the own vehicle, and is provided with a first predicted course calculation unit 21 and a second predicted course calculation unit 22. Of these plurality of course prediction means, the first predicted course calculating unit 21 calculates the future travel course of the own vehicle based on the trajectory of a preceding vehicle which is traveling ahead of the own vehicle. The second predicted course calculating unit 22 calculates the future travel course of the own vehicle based on the yaw rate of the own vehicle.

Specifically, the first predicted course calculating unit 21 receives inputs of the stationary object information from the stationary object information acquisition unit 23, the white line information from a white line information acquisition unit 24, and other vehicle's trajectory information from an other vehicle's trajectory acquisition unit 25. The predicted course computation unit 21 combines the pieces of inputted information to calculate a first predicted course RA as the future travel course of the own. The first predicted course calculating unit 21 can predict the course of the own vehicle without depending on the yaw rate of the own vehicle.

The stationary object information acquisition unit 23 calculates position information on roadside stationary objects (for example, a guardrail, a wall, etc.) present along the road on which the own vehicle is traveling, based on the distance measurement data from the radar device 12, and then outputs the position information to the first predicted course calculating unit 21 as stationary object information. The white line information acquisition unit 24 calculates information on a road separation line (white line) contained in the images captured by the imaging device 11, based on the image data from the imaging device 11, and outputs the calculated information, as white line information, to the first predicted course calculating unit 21. More specifically, the method of calculating the white line information includes extracting edge points to be candidates for white lines from the image data, based on, for example, a rate of horizontal illuminance change in the images. Then, the extracted edge points are sequentially stored on a frame-by-frame basis, to calculate white line information, based on the stored history of the edge points. The white line information acquisition unit 24 corresponds to the "lane line recognition means".

Based on the distance measurement data (information on distance and lateral position in relation to the own vehicle and the preceding vehicle) from the radar device 12, the other vehicle's trajectory acquisition unit 25 cyclically calculates the preceding-vehicle positions, consisting of coordinates expressing points traversed by a preceding vehicle, and stores the calculated preceding-vehicle positions in chronological order. Further, the other vehicle's trajectory acquisition unit 25 calculates the trajectory of the preceding vehicle based on the stored time-sequential data expressing the preceding-vehicle positions, and outputs the calculated trajectory to the first predicted course calculation unit 21, as other vehicle's path information. Further, the other vehicle's path acquisition unit 25 calculates path information for not only a vehicle traveling in the same lane as the own vehicle but also a vehicle traveling in a lane adjacent to that of the own vehicle, from among the preceding vehicles, and uses the information in predicting the course of the own vehicle.

FIGS. 2A-2D shows an outline of a procedure for calculating the first predicted course RA, executed by the first predicted course calculating unit 21. FIG. 2A illustrates a plurality of stationary object detection points Pa which are results of recognition, by the radar device 12, of a solid obstacle (e.g., a guardrail) as a roadside stationary object. FIG. 2B illustrates white-line information Pb which is a result of recognition of a white line by the imaging device 11. FIG. 2C illustrates the history of a plurality of vehicle detection points Pc, obtained by recognition of a preceding vehicle M2 by the radar device 12. Further, FIG. 2C illustrates a preceding vehicle M2 traveling in the same lane as an own vehicle M1, and another preceding vehicle M2 traveling in the lane adjacent to the own vehicle M1. FIG. 2D illustrates the first predicted course RA calculated by using the stationary object detection points Pa, the white line information Pb and the vehicle detection points Pc. It should be noted that a preceding vehicle position may be a vehicle detection point Pc itself, or may be obtained by averaging the vehicle detection points Pc for each of predetermined sections.

The first predicted course calculating unit 21 first compares the trajectory of the preceding vehicle M2, calculated using the vehicle detection points Pc, with the white line and the roadside stationary objects, and then excludes (disables) the trajectory of the preceding vehicle M2 which does not conform to the shape of the white line and the roadside stationary objects. Then, if there is only a single trajectory of a preceding vehicle M2 which is not excluded, then using that trajectory, the trajectory of the preceding vehicle M2 and the white line information Pb are weighted and averaged, to thereby calculate a first predicted course RA. If there are a plurality of trajectories of the preceding vehicles M2 which are not excluded, then using an average of the unexcluded trajectory, weighted averaging is applied to these trajectories of the preceding vehicles M2 and the white line information Pb, to calculate the first predicted course RA.

The second predicted course calculating unit 22 receives the radius of curvature (hereinafter referred to as "estimated R") of the road on the own vehicle M1 from a radius of curvature estimation unit 26, and uses the estimated R to calculate the second predicted course RB, which is a predicted course of the own vehicle M1. The radius of curvature estimation unit 26 calculates the estimated R based on the yaw angle detected by the yaw rate sensor 13 and the vehicle speed detected by the vehicle speed sensor 14. The method of calculating the estimated R is not limited to this. The estimated R may be calculated using image data for example, or may be calculated based on the steering angle detected by the steering angle sensor 15 and the vehicle speed detected by the vehicle speed sensor 14. The first predicted course calculating unit 21 corresponds to the "first prediction means", the second predicted course calculating unit 22 corresponds to the "second prediction means", and the first predicted course calculating unit 21 and second predicted course calculating unit 22 corresponds to the "plurality of course prediction means".

The predicted course setting section 30 performs switching to determine which one of a plurality of course prediction means is to be enabled. In the present case, one of the first predicted course RA calculated by the first predicted course calculation unit 21 and the second predicted course RB calculated by the second predicted course calculation unit 22 is selected, and the selected predicted course is set as being the current predicted course of the own vehicle M1. The followed vehicle setting unit 35 uses the predicted course enabled by the predicted course setting section 30 to select a preceding vehicle M2 from among the preceding vehicles M2 traveling ahead of the own vehicle M1, as the vehicle to be followed.

The control target value calculation unit 36 calculates a control target value, for maintaining the inter-vehicle distance between the followed vehicle which has been selected by the followed vehicle setting section 35 and the own vehicle by controlling the travel speed of the own vehicle M1. At this time, the control target value calculating unit 36 calculates a control target value, for maintaining the inter-vehicle distance, at predetermined target intervals. Specifically, the control target value calculating unit 36 calculates a target power output of the engine of the own vehicle, required braking force, etc., and outputs these values to an engine electronic control unit (engine ECU 41). In the present embodiment, the cruise control apparatus 10 outputs a control signal to the engine ECU 41, and the engine ECU 41 outputs the control signal to a brake electronic control unit (brake ECU 42). However, with this configuration, it would be equally possible for the cruise control apparatus 10 to output a control signal to each of the engine ECU 41 and the brake ECU 42.

With regard to the course prediction for the own vehicle M1, the present embodiment enables a course prediction result calculated by the first predicted course calculating unit 21, that is, a course prediction result obtained based on the trajectory of the preceding vehicle M2, to select the preceding vehicle using the enabled course prediction result. The reasons for this are as follows. When traveling along a straight road, there is hardly any difference between the first predicted course RA, which is the course prediction result that is based on the trajectory of the preceding vehicle M2, and the second predicted course RB which is the course prediction result that is based on the estimated R (see FIG. 3A).

In the case in which the vehicle that is being followed enters a curved road while the own vehicle M1 is still traveling along a straight road, before reaching the curved road, if the second predicted course RB is used to select the vehicle to be followed, there is a danger that, instead of following the preceding vehicle M2 that is in the same lane as that of the own vehicle M1, a preceding vehicle M2 which is in an adjacent lane may be selected as the vehicle to be followed. With the present embodiment, the vehicle to be followed is basically selected using the first predicted course RA.

However, there are circumstances in which the behavior of the own vehicle M1 is not suitable for the lane or road when changing course during a lane change or at a fork or a junction, etc. Under such circumstances, if cruise control of the vehicle is performed using the first predicted course RA, an acceleration delay might occur, due to a delay in deselecting a preceding vehicle M2.

FIGS. 3A-3C assumes a scene in which the own vehicle M1 is following a preceding vehicle M2, and the own vehicle M1 then changes its lane, thereby ceasing to follow the preceding vehicle M2. FIG. 3A illustrates a situation in which the own vehicle M1 is following the preceding vehicle M2. FIG. 3B illustrates a situation in which the own vehicle M1 starts lane change. FIG. 3C illustrates a situation in which the own vehicle M1 has completed lane change. Immediately after the driver of the own vehicle M1 commences a course change operation (e.g., steering) in a situation where the own vehicle M1 departs from following a preceding vehicle M2, the first predicted course RA indicates the next direction of the own vehicle. As shown in FIG. 3B, the first predicted course RA indicates a straight travel direction, which is the same as the direction indicated before the own vehicle M1 commences to change its course due to the presence of the preceding vehicle M2. In such a case, the selection of the preceding vehicle M2 is not immediately canceled, and the selection of the preceding vehicle M2 is continued, so that an acceleration delay occurs in the own vehicle M1, which may cause the driver to feel uneasy.

To solve this problem, with the present embodiment, a decision is made as to whether the course of the own vehicle M1 is to be changed. Based on the determination result, switching is performed to select the first predicted course RA or the second predicted course RB to be enabled for controlling travelling of the own vehicle M1.

Specifically, the predicted course setting section 30 in FIG. 1 includes a course change determination unit 31, a prediction switching unit 32, and a course change completion determination unit 33. The course change determination unit 31 receives inputs of the operation signal for the direction indicator 17 and the image data derived from the imaging device 11, and uses the input information to determine whether a course change of the own vehicle M1 is to be performed. When at least one of the following two change determination conditions is satisfied, it is determined that the course of the own vehicle M1 will be changed. One change determination condition (hereinafter, referred to as the "first determination condition") is that an operation signal inputted from the direction indicator 17 indicates that the direction indicator 17 has been manipulated by the driver to the left designation position or the right designation position. Another change determination condition (hereinafter, referred to as the "second determination condition") is that it is determined, based on the image data, that the own vehicle has crossed a white line (road separation line). The course change determination unit 31 outputs a determination signal, conveying information concerning the determination result, to the prediction changeover unit 32 and the course change completion determination unit 33.

The prediction switching unit 32 enables one of the first predicted course RA and the second predicted course RB, in accordance with the determination signal that is inputted from the course change determination unit 31. The predicted course that is enabled is set as the predicted course RC, which is the future travel course of travel of the own vehicle M1. More specifically, if the determination signal inputted from the course change determination unit 31 indicates absence of the course change of the own vehicle M1 (making no course change), the first predicted course RA is enabled. On the other hand, if the determination signal inputted from the course change determination unit 31 indicates presence of the course change of the own vehicle M1 (making a course change), the second predicted course RB is enabled. As shown in FIG. 2B, with the method of predicting the course based on the estimated R, it is possible to perform the course prediction in accordance with the yaw rate of the own vehicle M1 immediately after the commencement of a change in the course, irrespective of the presence of a preceding vehicle M2. Consequently, more accurate course prediction can be achieved when changing course.

When the course change completion determination unit 33 receives a determination signal indicating a course change of the own vehicle M1 from the course change determination unit 31, the course change completion determination unit 33 determines whether the course change has been completed. When the course change completion determination unit 33 receives the determination signal indicating presence of course change from the course change determination unit 31, a built-in timer commences counting up. When the count value becomes equal to or greater than the determination value, a completion determination signal indicating that the course change has been completed is outputted to the prediction switching unit 32. If the second predicted course RB is currently enabled, upon reception the completion determination signal from the course change completion determination unit 33, the prediction switching unit 32 disables the second predicted course RB, and enables the first predicted course RA in accordance with the reception of the completion determination signal. The course change determination unit 31 corresponds to the "change determination means", the prediction switching unit 32 corresponds to the "prediction switching means", and the course change completion determination unit 33 corresponds to the "completion determination means".

With reference to FIGS. 4 and 5, processing performed by the cruise control apparatus 10 according to the present embodiment will be described. This processing includes prediction switching processing and course change determination processing, performed by the course change determination unit 31, the prediction switching unit 32, and the course change completion determination unit 33 of the predicted course setting section 30. While a vehicle is traveling and the ACC switch 16 is ON, the ECU of the cruise control device 10 cyclically performs the processing.

FIG. 4 is a flow diagram of a procedure for prediction switching processing. As shown in FIG. 4, the cruise control apparatus 10 determines whether a course change of the own vehicle M1 is to be performed at step S101. If at least one of the first determination condition and second determination condition described above is satisfied, the course of the own vehicle M1 is determined to be changed.

FIG. 5 is a subroutine of a procedure for the course change determination processing (step S101 above). As shown in FIG. 5, at step S201, the travel control apparatus 10 determines whether the first determination condition of the change determination conditions is satisfied, that is, the travel control apparatus 10 determines whether an operation signal which signifies the operating lever of the direction indicator 17 being manipulated has been inputted, by the driver, to the left designation position or to the right designation position. If it is found that the first determination condition is satisfied (YES at step S201), control proceeds to step S204, to determine that the course of the host vehicle M1 is to be changed. On the other hand, if the first determination condition is not satisfied (NO at step S201), control proceeds to step S202 to determine whether the second determination condition of the change determination conditions is satisfied, that is, step S202 determines whether the host vehicle M1 has crossed a white line (road separation line).

If it has been determined that the second determination condition is satisfied (YES at step S202), control of the cruise control apparatus 10 proceeds to step S204, to determine that the course of the own vehicle M1 is to be changed. On the other hand, if the second determination condition is not satisfied (NO at step S202), control proceeds to step S203, to determine that the course of the own vehicle M1 is not to be changed. In other words, if the outcomes of steps S201 and S202 are all negative, control performed by the course change determination unit 31 of the cruise control apparatus 10 proceeds to step S203 to determine that the course of the own vehicle M1 is not to be changed. On the other hand if an affirmative decision is made in at least one of the steps S201 and S202, processing proceeds to step S204, where it is determined that the course of the host vehicle M1 is to be changed.

Referring back to FIG. 4, if the cruise control apparatus 10 determines that the own vehicle M1 does not make a course change (NO at step S101), the cruise control apparatus 10 terminates the current execution of this processing routine. On the other hand if the cruise control apparatus 10 determines that the own vehicle M1 makes a course change (YES at step S101), control proceeds to step S102, to determine whether the first predicted course RA is currently enabled as the predicted course RC. Consequently, the first predicted course determination RA is determined to be currently enabled as the predicted course RC, if the determination is made immediately after the driver has desired to change the course (for example, immediately after the driver has manipulated the operation lever of the direction indicator 17). If it is determined that the first predicted course RA is currently enabled as the predicted course RC (YES at step S102), control proceeds to step S103. At step S103, the predicted course RC to be enabled is switched from the first predicted course RA to the second predicted course RB. Control then proceeds to step S104.

However if it is determined that the first predicted course RA is currently enabled as the predicted course RC (NO at step S102), control skips step S103 and proceeds to step S104. At step S104, it is determined whether the own vehicle M1 has completed the course change. Consequently, if it is determined that the own vehicle M1 has not completed the course change (NO at step S104), the processing of this routine is temporarily terminated. On the other hand if it is determined that the own vehicle M1 has completed the course change (YES at step S104), control proceeds to step S105 to switch the predicted course RC to be enabled from the second predicted course RB to the first predicted course RA.

With the present embodiment described above in detail, the following valuable effects can be obtained.

The cruise control apparatus 10 according to the present embodiment includes the first predicted course calculating unit 21 and the second predicted course calculating unit 22, as a plurality of course prediction means having respectively different methods of predicting the future travel course of the own vehicle M1. Further, the cruise control apparatus 10 is configured to perform switching to determine which of the plurality of course prediction means is to be enabled, in accordance with whether the own vehicle M1 is making a course change. Factors such as the orientation of the own vehicle M1 with respect to its traveling direction, etc., differ between the case in which the own vehicle M1 is to change its course and the case in which the driver does not desire to change the course but to continue travelling in the same lane. Hence the optimum means for predicting the course of the own vehicle M1 differs between the case in which the own vehicle M1 is to change its course and the case in which no course change is to be made. In that respect, by adopting the above-described configuration, the cruise control apparatus 10 according to the present embodiment is enabled to select an optimal one of a plurality of course prediction means, from consideration of whether the own vehicle M1 is making a course change. This configuration more accurate prediction of the course of the own vehicle M1, at the time when a course is changed.

Specifically, the cruise control apparatus 10 according to the present embodiment includes, the first predicted course calculating unit 21, serving as a plurality of course prediction means, for predicting the course of the own vehicle M1 based on a trajectory of the preceding vehicle M2, and the second predicted course calculation unit 22 for predicting the course of the own vehicle M1 based on the yaw rate of the vehicle M1. The apparatus is configured such that, if it is determined that a course change of the own vehicle M1 is to be performed when the first predicted course RA calculated by the first predicted course calculation unit 21 has been enabled, a changeover is made from the first predicted course RA to the second predicted course RB, calculated by the second predicted course calculation unit 22, as the predicted course RC to be enabled. If the cruise control of the own vehicle M1 is performed by using the first predicted course RA based on the trajectory of the preceding vehicle M2 when the own vehicle M1 behavior does not conform to the lane or the road such as when changing course, then a delay may occur in deselecting the preceding vehicle M2. Further, when the own vehicle M1 is about to overtake a preceding vehicle M2, an acceleration delay might occur due to the delay in deselecting that preceding vehicle M2. However, by adopting the above-described configuration, the cruise control apparatus 10 according to the present embodiment, course prediction in accordance with the yaw rate of the own vehicle M1 can be achieved immediately after the start of a change in course, irrespective of the presence of the preceding vehicle M2. Consequently, course prediction can be performed more accurately when the course is changed.

The cruise control apparatus 10 according to the present embodiment includes the course change completion determination unit 33 as a determination means which determines that the own vehicle M1 has completed the course change after a determination that the course change of the own vehicle M1 is to be made. When the course change completion determination unit 33 determines that the course change has been completed, the predicted course RC to be enabled is switched from the second predicted course RB to the first predicted course RA. When the own vehicle enters a curved road after completing the course change while the second predicted course RB is enabled as the predicted course RC, a preceding vehicle M2 which is in an adjacent lane to that of the own vehicle M2 might be erroneously selected as the vehicle to be followed, instead of the preceding vehicle M2 that is in the same lane as the own vehicle M1. In view of this, the cruise control apparatus 10 according to the present embodiment is configured to quickly switch the predicted course RC to be enabled from the second predicted course RB to the first predicted course RA, when it is determined that a course change has been completed. Hence, the cruise control apparatus 10 of this embodiment more accurate prediction of the course of the own vehicle M1, when the own vehicle M1 enters a curved road after a course change has been performed.

The course change determination section 31 according to the present embodiment is configured such that, when it is detected that the driver of the own vehicle M1 has operated the direction indicator 17 provided in the own vehicle M1, it is determined that the course of the own vehicle M1 is to be changed. When a driver is going to change course, he/she usually turns on the direction indicator 17 before operating the steering wheel for actually changing the course, so that this action speedily reflects the driver's desire of changing the course. Hence, the course change determination unit 31 according to the present embodiment is configured to determine whether the course of the own vehicle M1 is to be changed based on whether the direction indicator 17 is operated, so that at the time of preparing to make a course change, the course change determination unit 31 can promptly switch the predicted course RC to be enabled from the first predicted course RA to the second predicted course RB. Consequently, the cruise control apparatus 10 according to the present embodiment effectively prevents a deterioration in responsiveness due to a delay in deselecting a preceding vehicle M2, for example in the case in which the own vehicle M1 is about to overtake the preceding vehicle M2.

In the case in which the predicted course RC is switched from the first predicted course RA to the second predicted course RB before making a change in the course, at a time when the own vehicle is travelling along a straight road, there is almost no difference in prediction accuracy between the first predicted course RA and the second predicted course RB (See FIG. 2A). Hence, with the above configuration, the cruise control apparatus 10 according to the present embodiment can prevent a deterioration in responsiveness while ensuring accuracy of predicting the course of the own vehicle M1.

Furthermore, with the course change determination section 31 according to the present embodiment, when it is detected that the own vehicle M1 has crossed a white line (road separation line) that is recognized based on the image data from the imaging device 11, the course change determination unit 31 determines that a course change is to be made. By adopting the above-described configuration, the cruise control apparatus 10 according to the present embodiment determines whether a course change has actually commenced, based on the information actually detected by the imaging device 11, and so can accurately determine whether the own vehicle M1 is to make a course change. In general, the imaging device 11 has high detection capability over short distances and good accuracy.

Other Embodiments

The present disclosure is not limited to the above embodiment, and may be implemented as follows.

In the above embodiment, the first predicted course calculating unit 21 receives stationary object information, white line information, and other vehicle's trajectory information and calculates the first predicted course RA using the inputted information. The method of calculating the first predicted course RA is not limited to this and the first predicted course RA may be calculated using only other vehicle's trajectory information, for example. Furthermore, the first predicted course RA may be calculated using other vehicle's trajectory information together with stationary object information, or may be calculated using other vehicle's trajectory information together with white line information.

There are situations in which the own vehicle M1 follows a preceding vehicle M2 at a speed that is above a predetermined value. It would be equally possible to use a configuration whereby, when it is determined that a course change of the vehicle is to be performed in such a situation, switching is performed to execute control travel of the vehicle by using a course that is predicted by one of a plurality of course prediction means. If the vehicle speed is sufficiently high, it can be considered that there is a high possibility that the driver desires to continue driving the vehicle. Hence, in such a case, it is desirable to implement the above type of control.

With the above embodiment, determination on whether a course change of the own vehicle M1 is to be performed is made in accordance with the following change determination conditions. These change determination conditions are: a condition that the driver of the own vehicle M1 has turned on the direction indicator 17 (first determination condition), and a condition that the own vehicle M1 has crossed a white line (road separation line), as detected based on the image data from the imaging device 11 (second determination condition). However, methods of determination as to whether the course is to be changed are not limited to these. For example, whether a course change of the own vehicle M1 is to be performed could be determined based on the steering angle of the vehicle. Specifically, if the steering angle detected by the steering angle sensor 15 is greater than a predetermined angle, it could be determined that the driver has performed a steering operation required for changing the course. Furthermore, with a configuration of using the image data from the imaging device 11 as a basis for determining whether the own vehicle M1 has crossed a white line, the determination may be made additionally considering the change in the steering angle of the vehicle. More specifically, if it is recognized that the own vehicle M1 has crossed over a white line (road separation line), based on the image data from the imaging device 11, while also the steering angle of the vehicle has changed to a higher value, it would be determined that the own vehicle M1 is to make a change in its course.

With the configuration of the above embodiment, a determination as to whether the course change has been completed is made based on the time that elapses since the determination signal is inputted from the course change determination section 31; however, the methods of determining completion of a course change are not limited to this. For example, the image data from the imaging device 11 may be used to determine completion of a course change, or the determination may be made based on a change in the steering angle of the vehicle. Furthermore, a course change may be determined to have been completed when the direction indicator 17 is turned off (when the operating lever is manipulated into the neutral position).

Even if the driver turns on the direction indicator 17, the driver may not necessarily actually change the course. In view of this, it may be so configured that a changeover from the second predicted course RB to disabling the first predicted course RA as the predicted course RC is performed when a predetermined time interval T1 has elapsed after the driver has turned on the direction indicator 17. With such a configuration for the travel control apparatus 10, erroneous selection of a vehicle M2 in an adjacent lane as the vehicle which is to be followed, for example when traveling along a curve, can be prevented as much as possible.

In the above embodiment, the imaging device 11 and the radar device 12 are provided as the object detection means. However, the embodiment is not limited to this configuration. For example, a configuration which is provided with a sonar for detecting objects by using ultrasonic waves as transmission waves may be applied to the configuration. Furthermore, the technique of the present disclosure may be applied to a vehicle to which the imaging device 11 is not mounted.

In the above embodiment, the present disclosure is described as applying to follow control, in which the own vehicle M1 travels following a preceding vehicle M2 that is in the same lane as the own vehicle M1. However, the technique of the present disclosure may be applied to a course prediction of the own vehicle M1 for avoiding collision between the own vehicle M1 and another vehicle. Further, the present disclosure may also be implemented in various forms, such as a program for having a computer executed each of the functions (each means) constituting the cruise control apparatus 10, a medium on which the program is recorded, and a method of vehicle cruise control etc.

REFERENCE SIGNS LIST

10 . . . Cruise control apparatus, 11 . . . Imaging device, 12 . . . Radar device, 13 . . . Yaw rate sensor, 17 . . . Direction indicator, 20 . . . Course prediction unit, 21 . . . First predicted course calculation unit, 22 . . . Second predicted course calculation unit, 23 . . . Stationary object information acquisition unit, 24 . . . White line information acquisition unit, 25 . . . Other vehicle's trajectory acquisition unit, 26 . . . Radius of curvature estimation unit, 30 . . . Predicted course setting section, 31 . . . Course change determination unit, 32 . . . Prediction switching unit, 33 . . . Course change completion determination unit, 35 . . . Followed vehicle setting unit, 36 . . . Control target value calculation unit, 41 . . . Engine ECU, 42 . . . Brake ECU.

The invention claimed is:

1. A vehicle cruise control apparatus which controls travel of an own vehicle based on a predicted course that is a future travel course of the own vehicle, the apparatus comprising:
   a plurality of course prediction means for calculating the predicted course;
   a change determination means for determining whether a change of the course of the own vehicle is to be performed based on a determination that a driver of the own vehicle intends to change lanes to an adjacent lane from a lane in which the own vehicle is following a preceding vehicle; and
   a prediction switching means for:
      selecting one of a predicted course among a plurality of predicted courses calculated by the plurality of course prediction means, based on a result of the determination made by the change determination means and
      setting the selected predicted course as a predicted course of the own vehicle so as to switch the predicted course used in vehicle cruise control, wherein
   the plurality of course prediction means comprise:
      a first prediction means for calculating a first predicted course, based on a trajectory of the preceding vehicle that is traveling ahead of the own vehicle; and
      a second prediction means for calculating a second predicted course, based on a yaw rate of the own vehicle, and
      in response to determining by the change determination means that the course is to be changed, while the first predicted course is set as being the predicted course of the own vehicle, the prediction switching means switches the predicted course from the first predicted course to the second predicted course, wherein
   in response to the change determination means determining that the course of the own vehicle is to be changed based on a result of detection that a direction indicator is operated, at a time that a predetermined time interval has elapsed after the direction indicator has been turned on by the driver, the prediction switching means switches the predicted course from the first predicted course to the second predicted course.

2. The vehicle cruise control apparatus according to claim 1, comprising:
   a completion determination means for determining completion of a course change of the own vehicle, after it is determined by the change determination means that the course change is to be performed, wherein
   the prediction switching means switches the predicted course from the second predicted course to the first predicted course when it is determined by the completion determination means that the course change has been completed.

3. The vehicle cruise control apparatus according to claim 1, wherein the change determination means determines that a course change of the own vehicle is to be performed, when it is detected that the vehicle driver has operated a direction indicator provided in the own vehicle.

4. The vehicle cruise control apparatus according claim 1, wherein
   the own vehicle is provided with an imaging device for capturing images of a surrounding environment, including a road being traveled by the own vehicle,
   the vehicle cruise control apparatus comprises a separator line recognition means for recognizing a separator line of the travel road based on the images captured by the imaging device, and
   the change determination means determines that a course change of the own vehicle is to be performed when it is detected that the own vehicle has crossed a separator line recognized by the separator line recognition means.

5. A cruise control method for a vehicle, which controls travel of an own vehicle based on a predicted course that is a future travel course of the own vehicle, the method comprising:
   determining whether a course change of the own vehicle is to be performed based on a determination that a driver of the own vehicle intends to change lanes to an adjacent lane from a lane in which the own vehicle is following a preceding vehicle;
   selecting one of a predicted course among a plurality of predicted courses calculated by a plurality of course prediction units, the selecting being performed based on a result of the determination as to whether the course of the own vehicle is to be changed; and
   setting the selected predicted course as a predicted course of the own vehicle so as to switch the predicted course used in vehicle cruise control, wherein
   the plurality of predicted course calculation units include:
      a first calculation unit for calculating a first predicted course, based on a trajectory of the preceding vehicle that is traveling ahead of the own vehicle; and
      a second calculation unit for calculating a second predicted course, based on a yaw rate of the own vehicle, and
   in response to determining that the course is to be changed, while the first predicted course is set as being the predicted course of the own vehicle, the predicted course is switched from the first predicted course to the second predicted course, wherein
   in response to determining whether a course change of the own vehicle is to be performed based on a result of detection that a direction indicator is operated, at a time that a predetermined time interval has elapsed after the direction indicator has been turned on by the driver, the predicted course is switched from the first predicted course to the second predicted course.

6. A cruise control system for a vehicle, which controls travel of an own vehicle based on a predicted course that is a future travel course of the own vehicle, the system comprising:
a memory;
a processor communicable to the memory; and
a set of computer-executable instructions stored on the memory that cause the processor to implement:
determining whether a course change of the own vehicle is to be performed based on a determination that a driver of the own vehicle intends to change lanes to an adjacent lane from a lane in which the own vehicle is following a preceding vehicle;
selecting one of a predicted course among a plurality of predicted courses calculated by a plurality of course prediction units, the selecting being performed based on a result of the determination as to whether the course of the own vehicle is to be changed; and
setting the selected predicted course as a predicted course of the own vehicle so as to switch the predicted course used in vehicle cruise control, wherein
the plurality of predicted course calculation units include:
a first calculation unit for calculating a first predicted course, based on a trajectory of the preceding vehicle that is traveling ahead of the own vehicle; and
a second calculation unit for calculating a second predicted course, based on a yaw rate of the own vehicle, and
in the processor, in response to determining that the course is to be changed, while the first predicted course is set as being the predicted course of the own vehicle, the predicted course is switched from the first predicted course to the second predicted course, wherein
in response to determining whether a course change of the own vehicle is to be performed based on a result of detection that a direction indicator is operated, at a time that a predetermined time interval has elapsed after the direction indicator has been turned on by the driver, the predicted course is switched from the first predicted course to the second predicted course.

7. The vehicle cruise control apparatus according to claim 1, wherein
when it is determined that a course change of the vehicle is to be performed, while a speed of the own vehicle is a predetermined value or more, the switching is performed to execute control travel of the vehicle using the predicted course that is calculated by one of the plurality of course prediction means.

8. The vehicle cruise control apparatus according to claim 1, wherein
the change determination means determines whether a time that elapses since it is determined that a course change of the vehicle is to be performed is a predetermined time or more, when it is determined that the time is the predetermined time or more, the change determination means determines that the course change has been completed.

9. The vehicle cruise control apparatus according to claim 1, wherein
in response to the change determination means determining that the course of the own vehicle is to be changed based on a result of detection that a direction indicator is operated by the driver, at a time of preparing to make a course change, the prediction switching means switches the predicted course from the first predicted course to the second predicted course.

10. The vehicle cruise control apparatus according to claim 1, wherein
the change determination means for determining whether a change of the course of the own vehicle is to be performed includes determining whether a change of the course of the own vehicle is to be performed irrespective of a number of preceding vehicles travelling ahead of the own vehicle.

11. The vehicle cruise control apparatus according to claim 1, wherein
the determination that the driver of the vehicle intends to change lanes is based on at least one of an operation of a direction indicator by the driver and a determination that the own vehicle has crossed a lane line.

12. A vehicle cruise control apparatus which controls travel of an own vehicle based on a predicted course that is a future travel course of the own vehicle, the apparatus comprising:
a plurality of course prediction means for calculating the predicted course;
a change determination means for determining whether a change of the course of the own vehicle is to be performed based on a determination that a driver of the own vehicle intends to change lanes to an adjacent lane from a lane in which the own vehicle is following a preceding vehicle; and
a prediction switching means for:
selecting one of a predicted course among a plurality of predicted courses calculated by the plurality of course prediction means, based on a result of the determination made by the change determination means and
setting the selected predicted course as a predicted course of the own vehicle so as to switch the predicted course used in vehicle cruise control, wherein
the plurality of course prediction means comprise:
a first prediction means for calculating a first predicted course, based on a trajectory of the preceding vehicle that is traveling ahead of the own vehicle; and
a second prediction means for calculating a second predicted course, based on a yaw rate of the own vehicle, and
in response to determining by the change determination means that the course is to be changed, while the first predicted course is set as being the predicted course of the own vehicle, the prediction switching means switches the predicted course from the first predicted course to the second predicted course, wherein
the change determination means for determining whether a change of the course of the own vehicle is to be performed includes determining whether a change of the course of the own vehicle is to be performed irrespective of a number of preceding vehicles travelling ahead of the own vehicle.

13. A vehicle cruise control apparatus which controls travel of an own vehicle based on a predicted course that is a future travel course of the own vehicle, the apparatus comprising:
a plurality of course prediction means for calculating the predicted course;
a change determination means for determining whether a change of the course of the own vehicle is to be performed based on a determination that a driver of the own vehicle intends to change lanes to an adjacent lane from a lane in which the own vehicle is following a preceding vehicle; and a prediction switching means for:

selecting one of a predicted course among a plurality of predicted courses calculated by the plurality of course prediction means, based on a result of the determination made by the change determination means and setting the selected predicted course as a predicted course of the own vehicle so as to switch the predicted course used in vehicle cruise control, wherein the plurality of course prediction means comprise:

a first prediction means for calculating a first predicted course, based on a trajectory of the preceding vehicle that is traveling ahead of the own vehicle; and a second prediction means for calculating a second predicted course, based on a yaw rate of the own vehicle, and in response to determining by the change determination means that the course is to be changed, while the first predicted course is set as being the predicted course of the own vehicle, the prediction switching means switches the predicted course from the first predicted course to the second predicted course, wherein the determination that the driver of the vehicle intends to change lanes is based on at least one of an operation of a direction indicator by the driver and a determination that the own vehicle has crossed a lane line.

14. A vehicle cruise control apparatus which controls travel of an own vehicle based on a predicted course that is a future travel course of the own vehicle, the apparatus comprising:

a plurality of course prediction means for calculating the predicted course;

a change determination means for determining whether a change of the course of the own vehicle is to be performed; and a prediction switching means for:

selecting one of a predicted course among a plurality of predicted courses calculated by the plurality of course prediction means, based on a result of the determination made by the change determination means and setting the selected predicted course as a predicted course of the own vehicle so as to switch the predicted course used in vehicle cruise control, wherein the plurality of course prediction means comprise:

a first prediction means for calculating a first predicted course, based on a trajectory of the preceding vehicle that is traveling ahead of the own vehicle; and a second prediction means for calculating a second predicted course without using the first predicted course, based on a yaw rate of the own vehicle, and in response to determining by the change determination means that the course is to be changed, while the first predicted course is set as being the predicted course of the own vehicle, the prediction switching means switches the predicted course from the first predicted course to the second predicted course.

* * * * *